United States Patent [19]
Nakagawa et al.

[11] 3,858,226
[45] Dec. 31, 1974

[54] EXPOSURE VALUE STORAGE DEVICE

[75] Inventors: Shiro Nakagawa, Chiba; Soichi Nakamoto; Yoshiyuki Takishima, both of Tokyo; Tetsuya Taguchi, Kawasaki; Masamichi Kakunodate, Tokyo, all of Japan

[73] Assignees: Canon Kabushiki Kaisha; TDK Electronics Co., Ltd., both of Tokyo, Japan

[22] Filed: June 5, 1973

[21] Appl. No.: 367,222

[52] U.S. Cl. ............................ 354/60, 354/51
[51] Int. Cl. ................................... G03b 7/08
[58] Field of Search ............ 95/10 CT, 10 CE; 340/174 PW

[56] References Cited
UNITED STATES PATENTS

| | | | |
|---|---|---|---|
| 3,378,823 | 4/1968 | Kaufman et al. | 340/174 |
| 3,397,394 | 8/1968 | Maeda | 340/174 |
| 3,712,190 | 1/1973 | Nobusawa | 95/10 |

*Primary Examiner*—Samuel S. Matthews
*Assistant Examiner*—Michael L. Gellner
*Attorney, Agent, or Firm*—Toren, McGeady and Stanger

[57] ABSTRACT

A photometer-driven exposure control unit for a camera is provided with a magnetic wire storage element that is subjected axially to a first current proportional to the exposure-determining output voltage of the photometer. The first current magnitude is stored as an analog quantity in the element in the form of a corresponding increment of magnetization by establishing an axial magnetic field through the element via a second current past through a surrounding first coil. The stored quantity may then be read out to the shutter timing circuit of the unit, e.g., by applying a third current through a second coil surrounding the element.

6 Claims, 7 Drawing Figures

EXPOSURE VALUE STORAGE DEVICE

The invention relates to an exposure value storage device, and in particular, to an exposure value storage device incorporating a magnetic wire element and preferred for use with cameras and the like.

It is known as in a single aperture reflex camera or the like to take a photometry of the luminance of an object being photographed immediately before taking a picture and to store the result in a storage such as a capacitor or the like to permit adjustment of an exposure time interval, that is, shutter speed, diaphragm aperture and the like, in accordance with the stored value when taking a picture.

The prior art exposure control unit incorporating a storage such as the capacitor or the like had a number of drawbacks including the inability to provide a storage over a prolonged period of time in view of the existence of leakage from the capacitor itself, together with associated inability to maintain an accurate stored value as well as the inability to permit a rapid storing operation because of the required charging time in excess of a given length for the capacitor to be charged for the intended storage.

There are the inevitable results of using a photoconductive light-receiving element such as CdS in the conventional exposure value storage device, the output voltage of which is directly used to charge a capacitor in order to provide storage of the exposure value in terms of the amount of charge thereon.

It is an object of the invention to eliminate the above-mentioned disadvantages of the conventional exposure value storage device. A feature of the invention resides in the use as a storage device of a magnetic wire element to which is applied a drive current which corresponds to the output of a light-receiving device. An exposure value is stored by applying a d.c. magnetic field having a variable level to the element in the direction in which the current is applied to thereby produce an analogue magnetization of the magnetic wire element which corresponds to the output of the light-receiving device.

The invention will be described below in terms of a specific embodiment thereof shown in the drawings, in which:

FIG. 1A is a fragmentary enlarged view of a magnetic wire element used in the invention, FIG. 1B graphically shows the characteristic of the element shown in FIG. 1A, FIG. 2 is a schematic view illustrating the storing coil winding on the magnetic wire element as used in the invention and also illustrating the principle of operation, FIG. 3 is a view showing the basic arrangement of the exposure value storage device according to the invention.

Figure 1A:
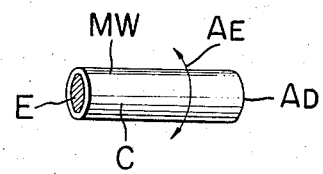

Referring to the drawings, FIG. 1A shows a fragmentary construction of a magnetic wire element MW used in the invention. E denotes a core wire material which comprises copper or copper alloy and C a layer of permalloy electroplated on the surface of the core wire material. In the electroplating process, the layer of permalloy is formed so as to have a mono-axial anisotropy in that an easy axis of magnetization in the circumferential direction AE of the permalloy layer C and a difficult axis of magnetization in the direction of core material AD.

Figure 1B:
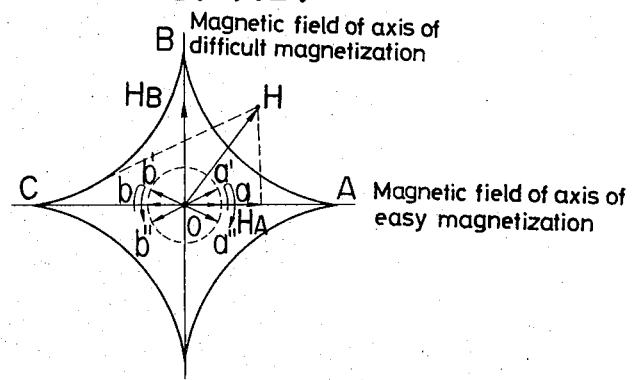
Figure 2:
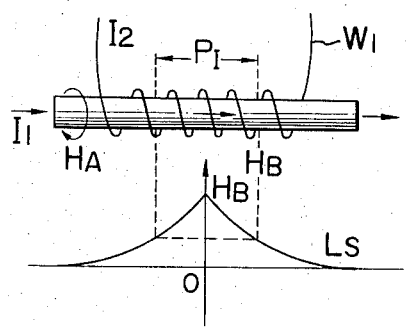

As shown in FIG. 2, an exciting coil $W_1$ is wound around the magnetic wire element MW with a uniform density. The magnetization characteristic when current is passed through the core material E of the element MW is shown in FIG. 1B. When a current $I_1$ is applied to the core material E of the wire element, a magnetic field HA is induced around the path of current so that the permalloy layer 2 will be magnetized in the easy axis of magnetization AE. On the other hand, when a current $I_2$ is applied to the coil $W_1$, the flux component in the direction HB of the coil causes the permalloy layer 2 to be magnetized in the difficult axis of magnetization. As shown in the lower part of FIG. 2, the distribution of field intensity of the magnetic field HB is such that the intensity distribution is reduced toward each end of the coil $W_1$. As a consequence, a switching loop (asteroid loop) is defined across the easy axis of magnetization and the difficult axis of magnetization as defined in FIG. 2. When a resultant magnetic field which reaches outside this switching loop, namely, a resultant field comprising the magnetic field in the easy direction of magnetization produced by the current $I_1$ and the field produced by the coil $W_1$, is applied, the layer of permalloy reverses its direction of magnetization. Thus the region outside the curve represents the region in which the application of a magnetic field results in a reversal of magnetization, while the region inside the curve represents nonreversal region. The characteristic loop will be further described below.

When a current is applied to the core material E of the magnetic wire element MW in a direction opposite to the direction of $I_1$ and simultaneously a current pulse is applied to the coil $W_1$, the layer of permalloy C is uniformly magnetized in the direction $\vec{OC}$, erasing the hysteresis magnetization of the permalloy layer C. To provide a desired storage operation, on exciting current $I_2$ is then applied to the exciting coil, thereby applying a magnetic field HB in the direction $\vec{OB}$ along the difficult axis of magnetization of the permalloy layer C of the magnetic wire element MW. When a current is applied subsequently to the core material E in the direction of $I_1$, there is achieved a magnetization HA in the direction $\vec{OA}$ along the easy axis of magnetization which is opposite to $\vec{OC}$. As a result, if the resultant field H comprising HA and HB reaches the region outside the switching loop, portions which were magnetized in the direction $\vec{OC}$ will be reversed. On the other hand, if the resultant field H has only such an intensity which remains inside the switching loop, that component of magnetization which is in the direction $\vec{OC}$ will not be reversed and remains unchanged. Consequently, when the magnetic field HB applied along the difficult axis of magnetization is set at a fixed value, there will be reversal or no reversal, respectively, if the resultant field H reaches or does not reach outside the loop in the first or second quadrant of FIG. 2, depending on the magnitude of the current $I_1$ that passes through the core material.

On the other hand, because the field intensity distribution of the coil $W_2$ is such that there occurs a peak value in the central portion of the coil as shown in FIG. 2, the central portion is easily reversed by the constant current $I_1$ while the reversal will be more difficult to be achieved toward the end of the coil. Therefore, when the level of magnetizing component by the current $I_1$ in the direction of the easy axis of magnetization is LS (FIG. 2), for example, it follows that only portion $P_1$ of the permalloy layer C will be reversed while the remainder will not be reversed, but remain unchanged.

Thus it will be seen that the length of the permalloy layer C which is reversed will vary in an analogue manner depending on the magnitude of the drive current $I_1$ which is applied to the core material E. Thus, the magnetic wire element locally undergoes a reversal of the direction of magnetization in a digital manner and such reversed portion undergoes a varying amount of magnetization in an analogue manner depending on the value of current which passes through the element, whereby the value of the current $I_1$ is stored as an analogue quantity in the reversely magnetized portion of the wire element.

Figure 3:
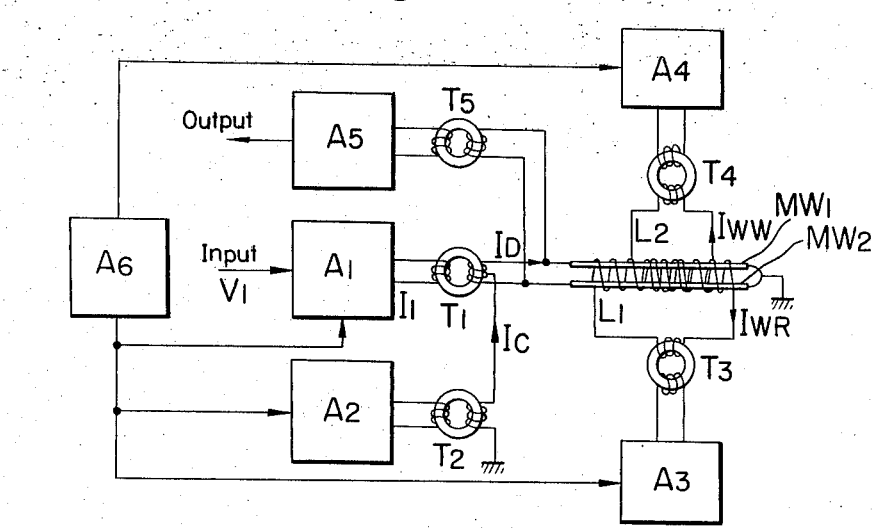
Figure 4:
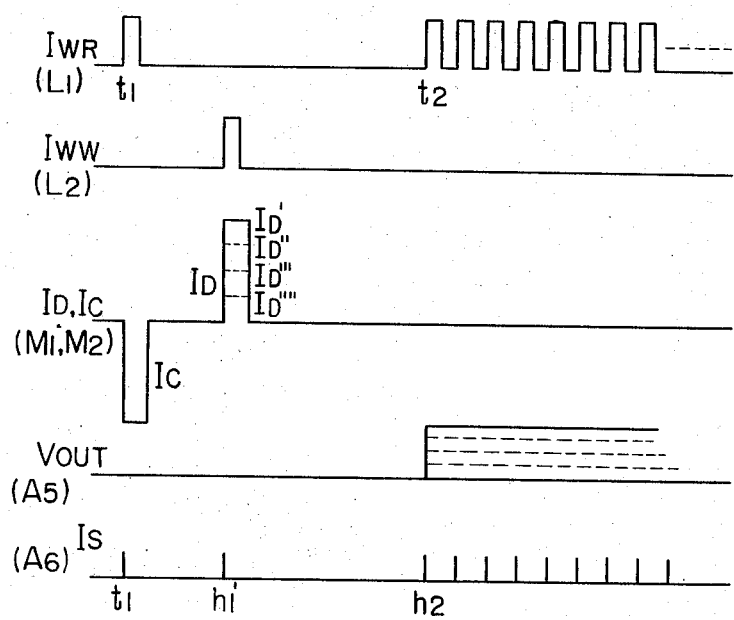
FIG. 4 shows waveforms of signals in the device shown in FIG. 3.

While the above description deals with the principle of storing operation according to the invention, such storing and reproducing operations can be realized with a control circuit shown in FIG. 3, for example. In FIG. 3, $MW_1$ and $MW_2$ denote magnetic wire elements as mentioned above, $L_2$ an exciting coil corresponding to the coil $W_1$ mentioned above, and $L_2$ erasing and reproducing coil which is wound over the coil $L_1$ and over the entire elements $MW_1$, $MW_2$. $A_1$ to $A_5$ denote control circuits which become operative when operating pulses from a synchronizing signal generator circuit $A_6$ are applied successively, $A_1$ being a control circuit having a current conversion function and $A_5$ being a control circuit having a rectifying and amplifying function (unidirectional level conducting function). $T_1$ to $T_6$ denote pulse transformers. When a synchronizing control signal is applied to the circuit $A_3$ by the operation of the signal generator circuit $A_6$, the control circuit $A_3$ applies an erasing pulse $I_{WR}$, shown in FIG. 4, to the pulse transformer $T_3$. At the same time, a control signal is applied to the control circuit $A_2$, the output of which applies a drive pulse to the pulse transformer $T_2$, whereby an erasing current IC, shown in FIG. 4, is applied to the core material of each core element through the winding of the pulse transformer $T_1$. As a result, the wire elements $MW_1$, $MW_2$ are uniformly magnetized in the direction $\overline{OC}$, whereby an erasure of residual magnetization of the elements is achieved. Then, an exposure value to be stored is detected by CdS photo-diode, for example, and its voltage $V_1$ is applied to the input of the current conversion control circuit $A_1$ to which is also applied a synchronizing control signal. At the same time, a synchronizing signal is also applied to the circuit $A_4$, whereby the wire elements $MW_1$, $MW_2$ undergo a reversal of magnetization and a magnetization in an analogue manner to an amount corresponding to the signal level value of the current $I_1$ which is proportional to the input voltage $V_1$, thereby providing a magnetization storage. When reproducing the value stored in the wire elements, a plurality of reproducing pulses are applied from the generator circuit $A_6$ to the control circuit $A_3$, whereby $I_{WR}$, shown in FIG. 4, is applied to the coil $L_1$ through the transformer $T_3$ at the time of $A_2$. As a result, the magnetization components stored in an analogue manner in the wire elements $MW_1$, $MW_2$ undergo a change $a \leftrightarrow a \leftrightarrow a'$, whereby a current is induced within the wire memory which causes a magnetic field to be produced that would suppress the change in the magnetic energy which results from the above-mentioned change in the direction of magnetization. The value of this induced current represents a reproduction of the stored value in an analogue manner. It is proportional to the quantity magnetically stored. In this process, that component ($\overline{CO}$ component) of the wire element which is not reversely magnetized is also reproduced in a similar manner, but the reproduced output having a polarity opposite to that of the reversed component is cut off by the rectifying function of the control circuit $A_5$. The reproduced wire element current is subjected to conversion into a voltage through the pulse transformer $T_5$, thereby yielding a regenerated voltage, as shown by the waveform $V_{out}$ of FIG. 4, having a level corresponding the values of the input current $I_D'$, $I_D''$, $I_D'''$, $I_D''''$ stored. While the control circuits which are adapted to effect given operations in response to the control signals from the synchronizing signal generator circuit $A_6$ are not described specifically, the control circuit $A_1$ is a current conversion circuit which converts the value of voltage $V_1$ to be stored into a value of current $I_1$ in response to a synchronizing signal from the signal generator circuit $A_6$, and the control circuit $A_5$ includes a rectifier circuit for rectifying and amplifying an alternating current which is produced in the wire elements $MW_1$, $MW_2$ upon reproduction, and is operated and controlled by the circuit $A_6$ generating the synchronizing signal IS, shown in FIG. 4, together with other circuits.

Figure 5:
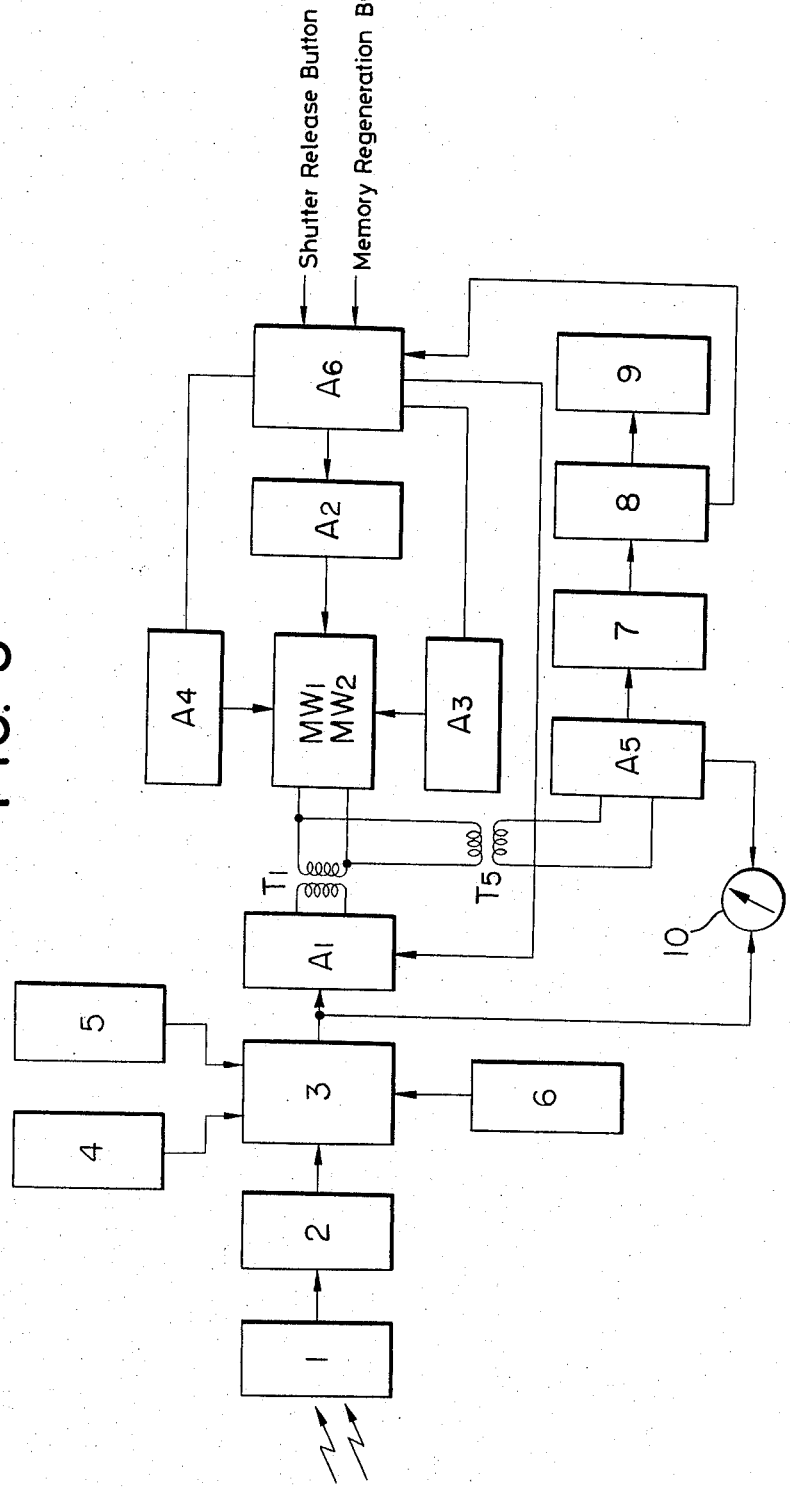
FIG. 5 is a view showing a specific arrangement of the exposure value storage device in which the invention is applied to a single aperture reflex electronic shutter circuit.

FIG. 5 shows a specific embodiment in which the exposure value storage circuit according to the invention is applied to an electronic shutter circuit of a single aperture reflex type. Because its operation is similar to the circuit shown in FIG. 3, the correspondence with FIG. 3 will be described. The arrangement shown illustrates the application of the exposure value storage device to an electronic shutter circuit of the type in which the diaphragm aperture is preferentially decided. In FIG. 5, 1 denotes a photometry circuit which includes a light-receiving element in the form of a photoconductor element such as CdS or the like or a photovoltaic element such as photo-diode or the like connected in its circuit and outputs an output current which corresponds to the luminance of an object being photographed, not shown. 2 denotes a log-diode or a wide band compactor circuit proposed previously by the present applicant (pending as Japanese Pat. application No. 6,146/70) and incorporating a negative feedback circuit, and represents a circuit which converts a change in the input current in the form of an arithmetic series into a change in the output voltage in the form of a geometrical series by logarithmically compacting the values of the input current. 3 denotes an arithmetic unit, 4 an input circuit for film speed information, 5 an input circuit for diaphragm aperture information and open F-number information of interchangeable lenses used, $A_1$, $A_2$, $A_3$, $A_5$ and $A_6$ those corresponding circuits shown in FIG. 3, and $T_1$ and $T_5$ corresponding pulse transformers mentioned above. 7 represents a known expander circuit which expands the output voltage reproduced from the reproduction control circuit $A_5$ and converts a change in the voltage which takes the form of a geometrical series into a change in the voltage which takes the form of a geometrical series. 8 denotes a timer circuit controlling the shutter time period. 9 an electromagnet which holds the rear screen of the shutter, and 10 an indicating meter. The timer circuit and the electromagnet 9 may be conventional and therefore will not be described.

In the above arrangement, conditions for taking a picture such as the shutter speed, diaphragm aperture and the like are inputted into the arithmetic unit 3 through the input circuits 4, 5, and a light-receiving element located within a camera, for example, located adjacent to the eye-piece in the path of light of the finder, is directed to an object being photographed, whereby the output of the element is converted by the compactor circuit 2 into a voltage value in a geometrical series and inputted into the arithmetic unit 3. In the arithmetic circuit 3, a signal voltage which sets the shutter period is applied to the control circuit $A_1$ in accordance with the other photographing conditions. The synchronizing signal generator circuit $A_6$ is operated by interlocking with the shutter release button, and applies, by way of the control circuits $A_2$, $A_3$, erasing currents IC, IWR to the wire elements $MW_1$, $MW_2$, from which the hysteresis is erased. Then the signal generator circuit $A_6$ applies a control signal to the control circuit $A_1$, whereby the output from the arithmetic unit 3 is fed through the transformer $T_1$ to be stored in the wire memories $MW_1$, $MW_2$. The time required for the storing operation is instantaneous since it is effected during the duration of the control pulse ID.

Upon further depressing the release button, a finder mirror, not shown, is raised, so that the light-receiving element ceases to be illuminated with the flux from the object being photographed, but a change in the output of the light-receiving element has no influence upon the wire memories $MW_1$, $MW_2$ because the control signal from the signal generator circuit $A_6$ is not applied to the control circuit $A_1$. Subsequently, the front screen of the shutter is released, whereupon the photo sensitive surface of a film is exposed and concurrently therewith, intermittent pulses are applied by the signal generator circuit $A_6$ to the control circuit $A_3$, whereby the magnetization component stored in the wire elements is reproduced to be applied to the pulse transformer $T_5$, and thereafter a voltage corresponding to the luminance of the object being photographed is outputted to the shutter period timer circuit 8 through the reproduction control circuit $A_5$ and the expander circuit 7. The timer circuit 8 is arranged such that the charging time period of a known timer network including a CR time constant circuit, for example, is controlled in accordance with the input voltage, and thus release the electromagnet 9 from operation after a given period of time, thereby releasing the rear screen and completing the exposure. The meter 10 indicates such shutter period, so that the exposure time may be recognized simultaneously.

Figure 6:
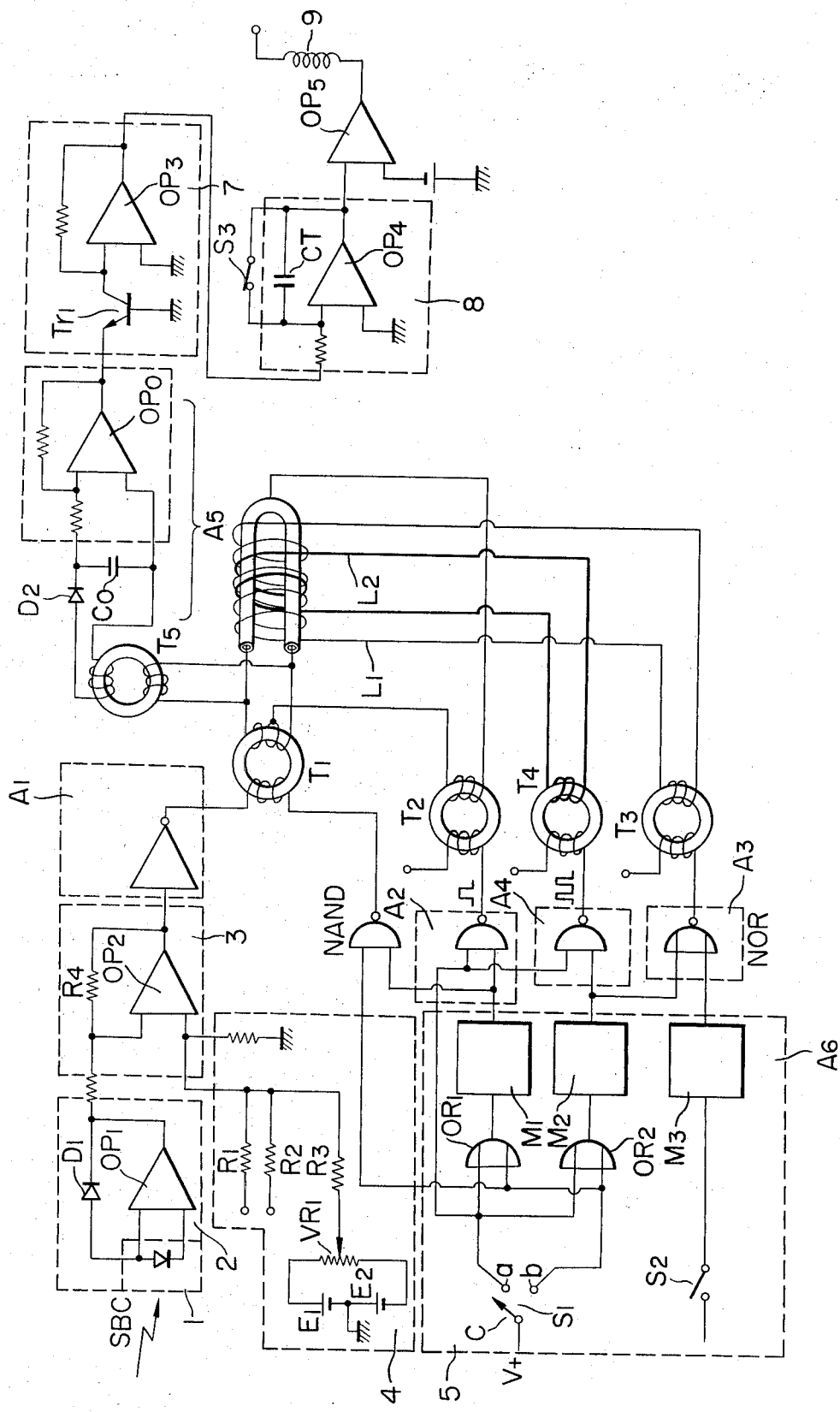
FIG. 6 is a specific electrical circuit of the electrical shutter circuit shown in FIG. 5.

FIG. 6 shows a specific electrical circuit for the electrical shutter circuit shown in FIG. 5. In this Figure, corresponding parts are designated by like characters as used in FIG. 5 to indicate the correspondence therebetween. A light-receiving element 1 comprises a photo-diode having a good response, and its output is connected across the inputs of an operational amplifier circuit $OP_1$. A log-diode $D_1$ is connected between the output and input of the operational amplifier circuit $OP_1$ so as to provide a circuit which exhibits a logarithmic compaction characteristic as its output characteristic. 3 denotes an arithmetic unit which comprises $OP_3$.

By using a variable resistor $VR_1$, a film speed information is applied to the input of the arithmetic circuit $OP_2$ through a resistor $R_3$, and other exposure information is connected with the input of the arithmetic unit $OP_2$ through a variable resistor, not shown, and resistor $R_1$ or $R_2$. The output of the arithmetic unit $OP_2$ is connected with the primary winding of the pulse transformer $T_1$ through a power amplifier circuit $A_1$. The control circuit $A_6$ comprises a switch $S_1$ which is interlocked with the release button (not shown), a switch $S_2$ interlocked with the finder mirror of a camera (such mirror being conventional in a camera and so not shown), logical sum circuits $OR_1$, $OR_2$, and monostable circuits $M_1$ to $M_3$. The movable contact C of the switch $S_1$ is changed to a contact a in the first stage of the shutter release, and is switched to another contact b upon further depression, which accompanies an upward motion of the mirror, not shown, followed by the initiation of the exposure upon releasing the shutter. The switch $S_2$ is closed when the mirror moves upward.

The output of the control circuit $A_5$ is connected with the emitter of a transistor $Tr_1$ within the logarithmic expander circuit 7, and the output of this transistor is applied to the input of the arithmetic unit $OP_3$. An integrator circuit 8 comprises a Miller's integrator having a capacitor $C_T$ connected in the feedback path of an arithmetic unit $OP_4$, and the integrating operation is initiated by a switch $S_3$ which opens by interlocking with the opening motion of the shutter. $OP_4$ represents an arithmetic unit for switching purpose and has its output connected with a magnet which serves closing the shutter.

In the above arrangement, when the shutter button is depressed, the movable contact c of the switch $S_1$ moves into contact with the contact a at time $t_1$, and a d.c. signal V+on the movable contact c sets the monostable multivibrators $M_1$, $M_2$ through $OR_1$, $OR_2$ circuits, and the multivibrator circuit $M_1$ applies a pulse signal of a fixed width to an NAND circuit within the control circuit $A_2$. The multivibrator circuit $M_2$ applies a pulse signal having a width less than that of the above described pulse signal to an NAND circuit within the control circuit $A_4$. As a consequence, the $A_2$ circuit causes, by reducing its output signal to zero, a primary current to flow through the transformer $T_2$, the induced current on the secondary coil thereof causing an erasing current Ic to be passed through the memory wire elements $MW_1$, $MW_2$. (In FIG. 6, a single wire element is folded back to serve the both.) This erases any magnetic signal previously stored in the elements. At time $t_1'$, the contact c of the switch $S_1$ is connected with the contact b, the mono-stable multivibrator circuit $M_1$ is set again, producing a pulse signal of a given width and applying it to the control circuit $A_2$. As a result, the NAND circuit provides a 0-output, and the output current $I_D$ of the current amplifier flows through the pulse transformer $T_1$. This results in achieving a desired storage in the wire elements as mentioned previously.

Subsequently, as the mirror moves up, the switch $S_2$ is closed to trigger an astable multivibrator $M_3$, whereby at time $t_2$, the astable multivibrator circuit $M_3$ produces a series of pulse signals ($A_6$ in FIG. 4), which are applied to an NOR circuit $A_3$. 0-output from the NOR circuit within the control circuit $A_3$ excites the pulse transformer $T_3$ to pass an exciting current $I_{WR}$ through a winding $L_1$ on the wire elements, thus effecting a read-out of the stored quantity. An output current from the wire elements is fed through the pulse transformer $T_5$, and rectified by a smoothing circuit which comprises a diode $D_2$ and capacitor $C_o$ before being applied to the integrator circuit 8 through the logarithmic expander circuit 7. When the shutter opens, the switch $S_3$ is opened, whereby a capacitor $C_T$ begins charging and the timing operation commences. After a given interval of time, a switching circuit $OP_5$ operates to supply an exciting current through the magnet 9, whereby the shutter is closed to complete the exposure.

From the foregoing, it will be understood that according to the invention, an exposure value is stored in the magnetic wire elements instantaneously and in the form of an analogue quantity, which permits a storage operation over an extensive range and with high accuracy, thereby providing an enhanced effectiveness and allowing retention of the stored quantity over a prolonged period of time preferred for use with a long time exposure. The use of wire elements for storage and reproduction of the luminance of an object being photographed so as to provide a timing operation as proposed in accordance with the invention is particularly useful for the control circuit of an electrical shutter of a camera.

It should be understood that while in the above description of the embodiment, the exciting coils $L_1$ and $L_2$ are shown as separate elements, the similar result may be obtained by using a single coil in combination with a switch which selectively applies the outputs from the transformers $T_3$, $T_4$ to the coil.

What is claimed is:

1. An exposure control device comprising light-receiving means for receiving light from an object being photographed and converting it into an electrical signal, a magnetic wire element selectively and electrically coupled with the light-receiving means and applied with a drive current corresponding to the output therefrom, first exciting means for applying a d.c. magnetic field of a varying level to the wire element in the direction in which the current is applied, current detecting means electrically connected across the current path through the wire element, second exciting means for applying a d.c. magnetic field of a varying level to the wire element in the direction in which the current is applied, and control signal generating circuit, said generating circuit being operable, during photometry of light from the object being photographed, to apply the output of the light-receiving means to the wire element and to excite the first exciting means, and being operable, during control of an exposure, to produce sequentially signals which operate the current detecting means and the second exciting means to their active states, whereby luminance of the object being photographed is stored magnetically in the wire element during photometry and an electrical signal corresponding to the stored value is produced during exposure.

2. An exposure control device according to claim 1 in which the control signal generating circuits comprises a control gate circuit coupled between the light-receiving means and the wire element, a second control gate circuit coupled with the first exciting means, a third control gate circuit coupled with the second exciting means, and a signal generator circuit for applying a synchronizing signal to each of the control gate circuits.

3. An exposure control device according to claim 1 in which the control signal generating circuit comprises a control gate circuit interconnecting the light-receiving means with the wire element and a pulse transformer connected to the output of the control gate circuit, a second control gate circuit and a second pulse transformer connected with the first exciting means, the output of the second transformer being connected with the first exciting means, a third transformer connected with the second exciting means and a third control gate circuit connected with the output of the third transformer, and a signal generator circuit for applying a synchronizing signal to each of the control gate circuits to render them conductive.

4. An exposure control device according to claim 1 in which a pair of said wire elements are disposed parallel to each other, with their one end electrically connected together, each of the wires comprising a core material having an easy axis of magnetization in the direction in which the current is applied, and a difficult axis of magnetization circumferentially thereof.

5. An exposure control device according to claim 4 in which each of the first and second exciting means comprises a coil wound around the outer periphery of the pair of parallel wire elements over the full length thereof.

6. An exposure control device according to claim 1 in which the magnetic wire element comprises a core material having an easy axis of magnetization in the direction in which the current is applied, and a surrounding material disposed on the outer periphery of the core material and having a difficult axis of magnetization in its periphery in a direction orthogonal to the direction in which the current is applied.

* * * * *

UNITED STATES PATENT OFFICE
CERTIFICATE OF CORRECTION

Patent No. 3858 226                Dated December 31, 1974

Inventor(s) SHIRO NAKAGAWA et al

It is certified that error appears in the above-identified patent and that said Letters Patent are hereby corrected as shown below:

In the heading of the patent, insert:

-- [30] Foreign Application Priority Data:

Japan, June 9, 1972    47-57540

Signed and sealed this 4th day of March 1975.

(SEAL)
Attest:

RUTH C. MASON
Attesting Officer

C. MARSHALL DANN
Commissioner of Patents
and Trademarks